United States Patent [19]

Pierce

[11] 4,143,640
[45] Mar. 13, 1979

[54] VENETIAN-BLIND SOLAR COLLECTOR

[75] Inventor: Norton T. Pierce, Concord, Mass.

[73] Assignee: Massachusetts Institute of Technology, Cambridge, Mass.

[21] Appl. No.: 783,117

[22] Filed: Mar. 31, 1977

Related U.S. Application Data

[63] Continuation of Ser. No. 575,767, May 8, 1975, abandoned.

[51] Int. Cl.² .............................................. F24J 3/02
[52] U.S. Cl. ..................................... 126/270; 237/1 A
[58] Field of Search ............... 126/270, 271; 237/1 A; 160/236; 350/284, 288, 299

[56] References Cited

U.S. PATENT DOCUMENTS

| | | | |
|---|---|---|---|
| 1,325,596 | 12/1919 | Trosper | 126/271 |
| 1,696,003 | 12/1928 | Harvey | 126/271 |
| 2,209,355 | 7/1940 | Schmitz | 160/236 |
| 2,544,474 | 3/1951 | Swanton, Jr. | 126/271 |
| 2,553,073 | 5/1951 | Barnett | 126/271 |
| 2,594,232 | 4/1952 | Stockstill | 126/271 |
| 3,048,375 | 8/1962 | Walker | 126/270 |
| 3,107,052 | 10/1963 | Garrison | 126/271 |
| 3,227,153 | 1/1966 | Grodel et al. | 126/271 |
| 3,964,464 | 6/1976 | Hockman | 126/270 |
| 4,034,736 | 7/1977 | Telkes | 126/270 |

FOREIGN PATENT DOCUMENTS

| | | | |
|---|---|---|---|
| 1165672 | 10/1958 | France | 126/270 |
| 1287760 | 2/1962 | France | 126/270 |

Primary Examiner—Henry C. Yuen
Attorney, Agent, or Firm—Arthur A. Smith, Jr.; Robert Shaw

[57] ABSTRACT

A venetian-blind solar collector system having several slat-like members each of which has a radiation-reflecting surface and a heat exchange mechanism, radiation being reflected from the reflecting surface of one member of the collector to the heat exchange mechanism of another member. The members can be oriented to provide energy collection during certain periods of time and then re-oriented to provide a thermal insulating function. The system includes storage facilities for a heated liquid.

17 Claims, 5 Drawing Figures

VENETIAN-BLIND SOLAR COLLECTOR

This is a continuation of application Ser. No. 575,767, filed May 8, 1975, now abandoned.

The present invention relates to solar collector systems and, more particularly, to solar collector systems wherein the collector serves as well to effect thermal insulation of a heated space or chamber.

Attention is called to the following U.S. Pat. Nos.: 603,317 (Calver); 719,065 (Wadsworth); 1,271,800 (Sutton); 1,951,404 (Goddard); 2,288,465 (Knudsen); 2,595,905 (Telkes); 2,596,479 (Goldstine); 2,857,634 (Garbade et al); 2,931,578 (Thompson); 2,861,166 (Cargill, Jr.); 2,945,417 (Caryl et al); 2,969,918 (Phelps); 3,012,294 (Waldor); 3,048,375 (Walker); 3,058,394 (Edlin); 3,243,117 (Morgan); 3,254,207 (Lowell); 3,613,659 (Phillips); 3,738,740 (Campbell); and French patent 1,287,760.

The major problem with windows of dwellings, office buildings, greenhouses, etc., which are exposed to the sun all or part of the day is that they admit too much of the incoming solar radiation and are a major source of heat loss during cold days when the sun is not shining at them. The problem is normally handled by coating or tinting the glass to reflect a large part of the incoming radiation. This available energy is thus lost. To reduce heat loss when the sun is not shining on them, double thicknesses of glass with insulating space between are used or windows are covered with heavy drapes or venetian blinds.

Accordingly, a principal object of the present invention is to provide a solar collector that provides very effective collection of solar energy, but provides, as well, thermal insulation during time periods when such energy is not available or not needed.

Another object is to provide a solar collector and system that can be retro-fitted into existing structures and, in particular, in the window areas of such structures.

Still another object is to provide a solar collector for such window areas to intercept all the incoming solar radiation but one which, nevertheless, permits considerable visibility through the window.

A further object is to provide such a solar collector in the form of a venetian blind wherein a reflecting surface on one slat of the blind and a heat exchange surface on another interact to perform the collecting function and wherein the setting of the collector when performing the collecting function can be maintained for a fairly long period of, say, a week without need for change to correct for changes in the elevation of the sun.

A still further object is to provide a solar collector system which performs a heating function as to a chamber with which it is associated, for example, in that energy collected, while it is being collected or later, is introduced to the chamber to-be-heated.

A still further object is to provide a collector which is relatively economical to build and install.

These and still further objects are addressed in the specification that follows and are particularly delineated in the appended claims.

The objects of the invention are achieved in a venetian-blind solar collector wherein many slat-like members interact to collect solar energy. Each slat-like member has a parabolic reflecting surface and heat exchange means. Each member is pivotally supported at each end and is so positioned relative to an adjacent member that the member can be oriented with respect to the sun in such a way that the sun's rays are reflected from that member upon a heat absorbing surface of the heat exchange means of another, and adjacent, member. Thus, in a typical installation, the members are positioned one above the other and are oriented in a way that solar energy is reflected by the reflecting or front surface of the lowest slat upon the heat absorbing or rear surface of the next higher slat, and so forth, to the uppermost slat of the blind. The width of each slat and longitudinal separation between slats are such that the blind can be closed to insulate a space or room from an outside environment.

The invention is hereinafter described with reference to the accompanying drawing in which.

Figure 1:
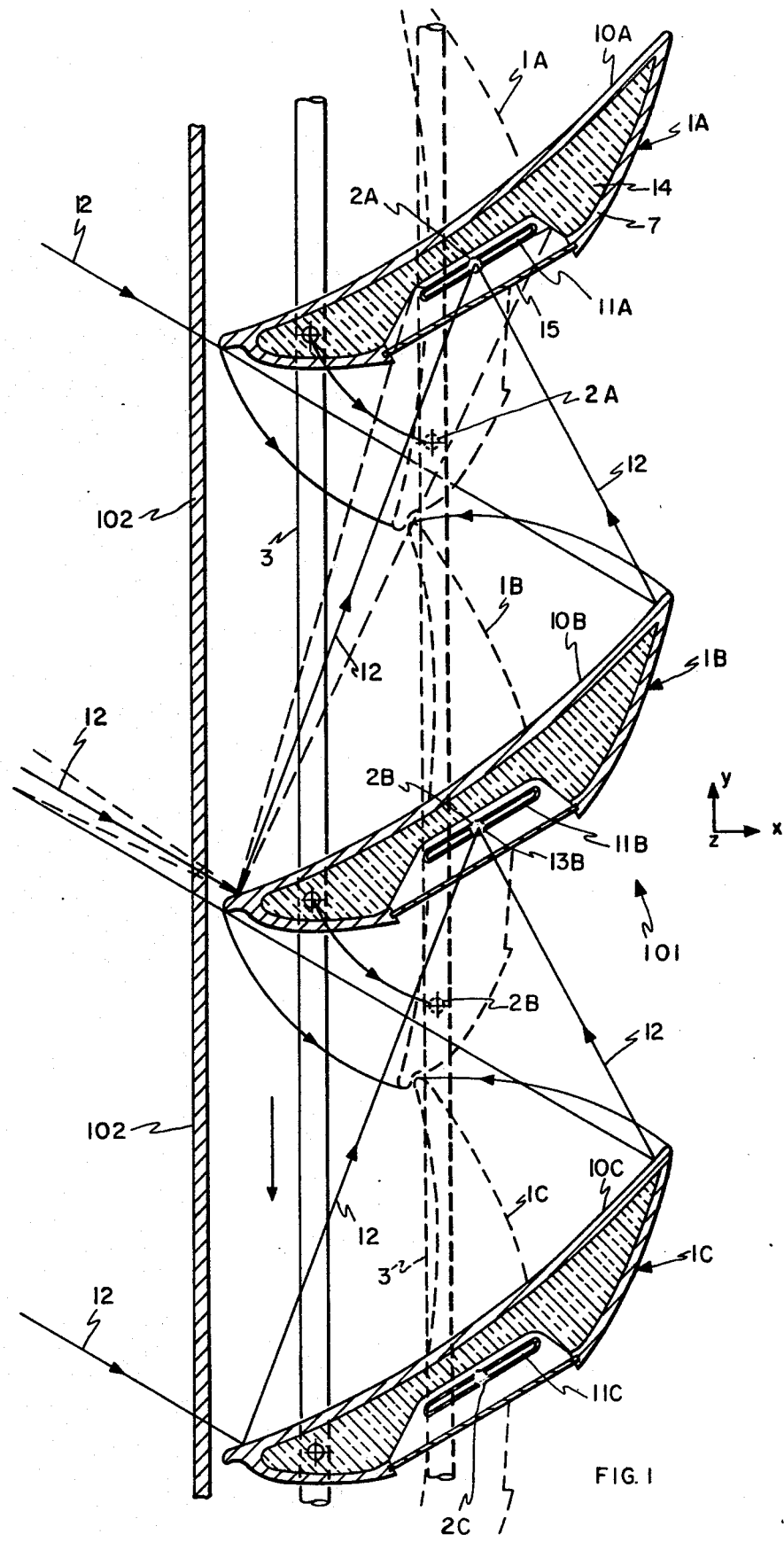
FIG. 1 is a side sectional view showing a three-slat, venetian-blind, solar collector embodying the present inventive concepts, the solid-line representation showing the slats oriented to collect solar energy and the broken-line representation showing the slats oriented to insulate a space or room to the right of the collector from an outside environment to the left thereof.

The invention herein disclosed is particularly useful for installation in existing buildings which often have large window areas that, at present, pass solar energy into the building when it is least needed, or is unwanted, and pass heat out from the building when it should be retained. The venetian-blind solar collector shown at 101 in FIG. 1 serves to rectify both situations when installed behind a window 102 of a building or the like as shown and as now explained.

The venetian-blind solar collector 101 comprises a plurality of slats or slat-like members 1A, 1B, 1C, etc., displaced from one another along the longitudinal axis (i.e., the y-axis in FIG. 1) of the collector from one another. The slat-like members 1A . . . are pivotal about a transverse axis (i.e., the z-axis in FIG. 1) from the open condition shown in solid lines in FIG. 1, to the closed condition shown in broken lines. The pivot points are labeled 2A, 2B and 2C for the slats 1A, 1B and 1C, respectively. Each slat has a parabolic reflecting surface, the surfaces labeled 10A, 10B and 10C respectively for the slats 1A, 1B, and 1C, and heat exchange means, the elements labeled 11A, 11B and 11C, respectively. When in the open condition and properly oriented to the sun, the sun's rays, designated 12 in the drawing are reflected from the reflecting surface (e.g., the surface 10C) of one member upon a heat absorbing surface of the heat exchange means of another member; thus, by way of illustration, the sun's rays are reflected from the surface 10C upon the heat absorbing surface shown at 13B of the adjacent slat 11B. The vertical rod labeled 3 serves to provide the necessary pivoting forces for opening, closing and setting or orienting the collector 101.

Figure 2:
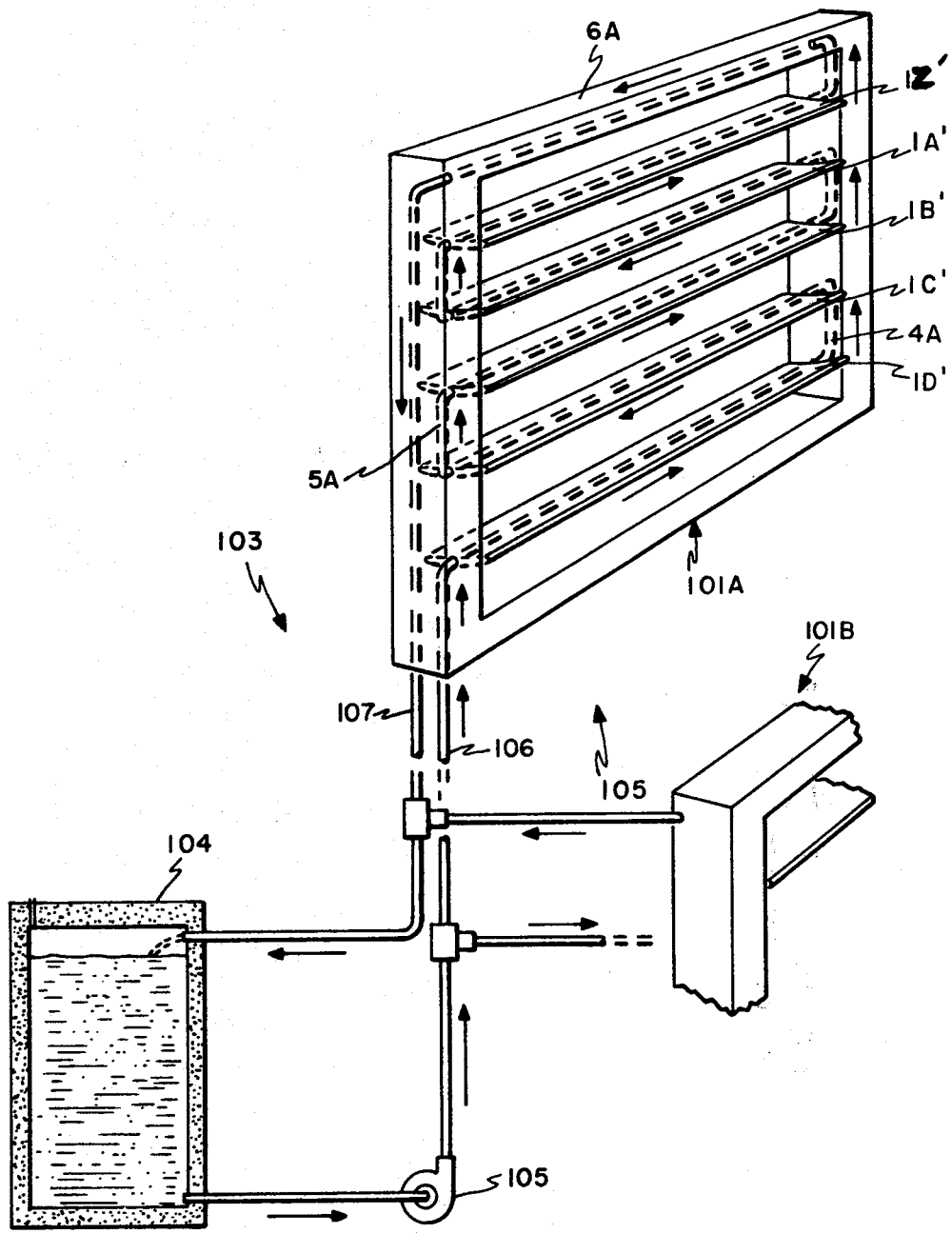
FIG. 2 is a schematic representation showing an isometric view of a collector, like that in FIG. 1, for example, a liquid storage tank, and a pump to move liquid between the tank and the collector.

Turning now to FIG. 2, the system shown at 103 includes one or more venetian-blind solar collectors 101A, 101B . . . each of which comprises a plurality of slats (e.g., the slats labeled 1Z' . . . 1D' of the collector 101A) that functions like the slats of the collector 101. The system further includes an insulated storage tank 104 and a pump 105 to pump the exchange medium (which can be water or some other liquid) between the storage tank and the venetian-blind solar collector through pipes 106 and 107.

In the collector 101A the slats 1Z'...1D' are serially connected, that is, the water or other heat exchange medium flows up through the pipe 106 and into the slat 1D' and through to a short interconnecting pipe 4A, thence to and through the slat 1C' to a short interconnecting pipe 5A, etc., to the slat 1Z' and to storage tank 104. The pipes 106, 4A, 5A ... serve as fluid carriers, but they serve, as well, as pivots or bearings within which shafts or journals of the slats are received to permit the individual slat-like members 1D'...1Z' to be pivoted or rotated to receive the sun's rays and to focus such rays, and, as is noted previously, the slats act as well, when they are in the closed condition shown in broken lines in FIG. 1, to insulate the room against heat transfer through the window 102. Also, during the night or other periods of little or no sun, hot water can be circulated from the storage tank 104 to the collector 101A which, in that circumstance, acts as a heater. Each collector has a supporting frame such as the frame marked 6A, for example. There now follows a discussion of the slat 1A that is typical of the slats or slat-like members 1B, 1C ... and 1D' ... 1Z'.

The slat 1A (in FIG. 1) includes a shell 7 which can be extruded aluminum; if the shell is so made, the reflecting surface 10A is an aluminum surface. The heat exchange means is a hollow flattened metal tube 11A. Insulation 14 is provided between the tube 11A and the reflecting surface 10A of the member 1A. The insulation in the member acts to insulate the tube 11A from the ambient and it acts, also, to minimize that transfer through the member to insulate the room against the outside in the manner above described. An insulating window 15 serves to allow radiation to strike the heat absorbing lower surface of the tube 11A while minimizing heat loss. The window 15 can be made of clear glass or plastic and can be treated to allow efficient transmission of the incoming solar radiation while blocking outgoing infrared radiation (see applications for Letters Patent Ser. No. 534,122 filed Dec. 18, 1974 (Fan et al) now abandoned; Ser. No. 534,123 filed Dec. 18, 1974 (Fan et al) now abandoned; and Ser. No. 498,160 filed Aug. 16, 1974 (Fan et al) now abandoned and continuation-in-part filed May 27, 1976, Ser. No. 690,696 now abandoned). The heat absorbing surface of the tube 11A can be treated with a material such as black copper oxide or black nickel layers, for example, to give selective transmission of radiation frequencies, thereby to provide high absorptance of solar radiation, but to have low emittance of long wavelength infrared radiation. The width of the tube 11A should be great enough to allow for use in a fixed angular position during a change in solar elevation for a period of a week or more without readjustment.

Figure 3:
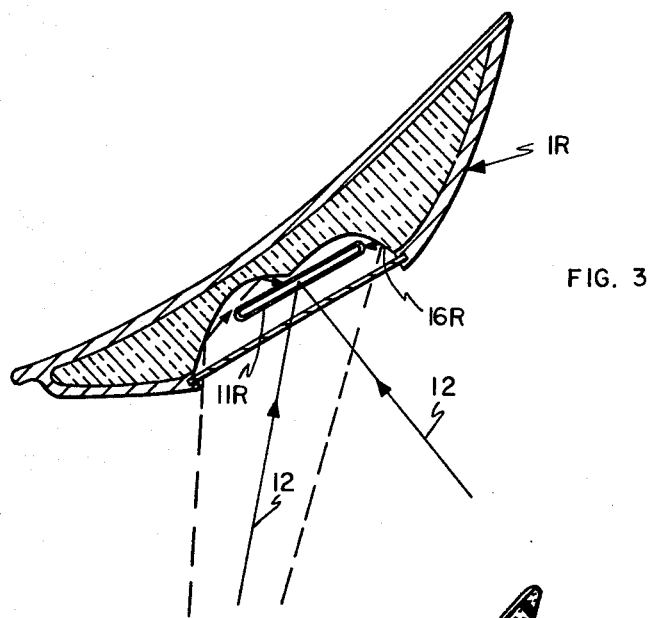
FIGS. 3, 4 and 5 are side, sectional views of modifications of the slats in FIG. 1.
Figure 4:
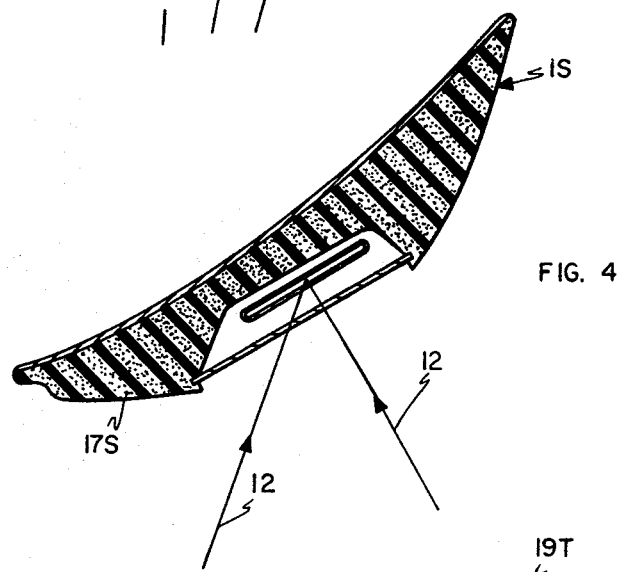
Figure 5:
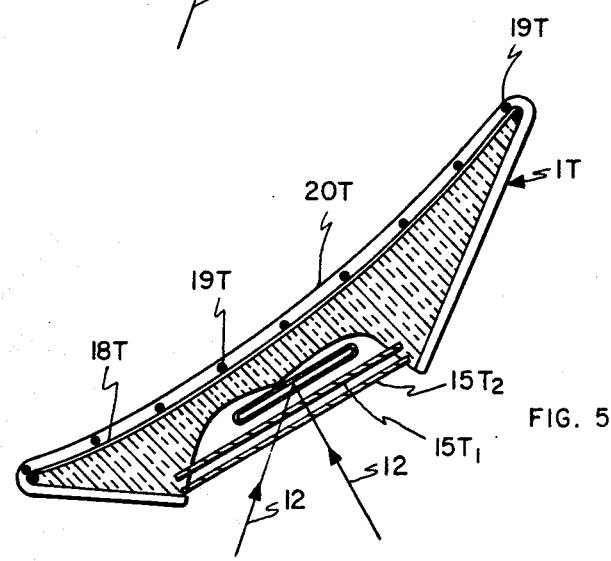

The slat-like member marked 1R in FIG. 3 has, in addition to the elements of the member 1A, a secondary reflector 16R arranged to accept off-axis rays and to direct them to the collector tube labeled 11R. The slat-like member shown at 1S in FIG. 4 comprises a rigid foam insulation 17S: the reflecting surface can be aluminum as before. In the slat-like member designated 1T in FIG. 5, the reflecting surface of the member is provided by a reflector comprising a replaceable metalized plastic sheet 18T which is retained under parallel wires or cords 19T held at the ends thereof under tension and positioned to produce a parabolic reflector shape. A plastic or other cover 20T protects the reflecting surface. Also, the member 1T has two insulating windows $15T_1$ and $15T_2$.

Further modifications of the invention herein disclosed will occur to persons skilled in the art and all such modifications are deemed to be within the spirit and scope of the invention as defined by the appended claims.

What is claimed is:

1. A venetian-blind solar collector that comprises, in combination: a plurality of slat-like members spaced on generally parallel axes, respective supporting unit means at each end of the plurality of slat-like members to receive said members operative to permit each member to pivot about its axis each member having a focusing reflecting surface at one side thereof and a heat absorbing surface at the other side thereof such that the sun's rays are reflected from the reflecting surface of one member and concentrated upon the heat absorbing surface of the adjacent member of the collector, and heat exchange means in said members adjacent to the absorbing surface thereof, to absorb energy from the associated heat absorbing surface.

2. A venetian-blind collector as claimed in claim 1 in which the reflecting surface is parabolic, in which the heat exchange means of each member comprises a tube oriented in the respective axis direction, through which a heat exchange medium can flow, and in which the respective supporting unit means at each end of the plurality of slat-like members comprises pipes that serve as heat transfer media carriers, but serve, as well, as pivots or bearings to permit pivoting of each member about the respective axis.

3. A venetian-blind solar collector as claimed in claim 2 that further includes insulation between the tube and the reflecting surface of each member, the insulation in each member acting to insulate the tube of the member from the ambient and to minimize heat transfer through the member, each member having an insulating window to allow radiation to strike the heat absorbing surface while minimizing heat loss.

4. A solar collector system that includes a plurality of the venetian-blind solar collectors of claim 2 and further includes insulated storage means for the exchange medium and means to pump the exchange medium between the storage means and the venetian-blind solar collectors.

5. A venetian-blind solar collector that comprises, in combination: a plurality of slat-like members spaced on generally parallel axes, respective supporting unit means at each end of the plurality of slat-like members to receive said members to permit each member to pivot about its axis; each member having a focusing reflecting surface at one side thereof and a heat absorbing surface at the other side thereof, the members being oriented, in an operating collector, such that the sun's rays are reflected from the reflecting surface of one member and concentrated upon the heat absorbing surface of the adjacent member of the collector, and heat exchange means in said members, adjacent to the absorbing surface thereof, to absorb energy from the associated heat absorbing surface.

6. A venetian-blind solar collector wherein many slat-like members interact to collect solar energy, that comprises, in combination: means comprising a plurality of slat-like members vertically displaced from one another, each slat-like member being oriented parallel to others, each slat-like member having a parabolic focusing reflecting surface, and heat exchange means having a heat absorbing surface, each member having supporting means at each end to permit each member to pivot about its longitudinal axis and being so positioned relative to an adjacent member that one member can be oriented such that the sun's rays are reflected from the parabolic reflecting surface of the one member and concentrated upon the heat absorbing surface of the heat exchange means of another, and adjacent, member.

7. A venetian-blind solar collector that comprises, in combination: a plurality of slat-like members substantially vertically displaced from one another, each slat-like member being oriented parallel to the others; supporting unit means at each end of the plurality of slat-like members to receive said members to permit each member to pivot about its longitudinal axis; each member having a focusing reflecting surface at one side thereof, and a heat absorbing surface at the opposite side such that the sun's rays are reflected from the reflecting surface of one member and concentrated upon the heat absorbing surface of the adjacent member of the collector; and heat exchange means in said members, adjacent to the absorbing surface thereof, to absorb energy from the associated heat absorbing surface.

8. A solar collector that comprises, in combination: a plurality of spaced slat-like members each having a focusing reflecting surface on one side thereof for concentrating reflected radiation and each member having a heat exchange means therein; each heat exchange means having operatively connected thereto a heat absorbing surface means disposed on the opposite side of the respective member; wherein such members are juxtaposed adjacent to each other with respect to the sun so as to reflect the rays thereof concentratedly from the reflecting surface of one member to the heat absorbing surface means of the adjacent member.

9. A solar collector as set forth in claim 8, each said heat absorbing surface means comprising a hollow flattenned tube wherein the width dimension faces a respective reflecting surface from which radiation is reflected thereto.

10. A venetian-blind solar collector wherein many slat-like members interact to collect solar energy, that comprises, in combination: means comprising a plurality of slat-like members displaced from one another on respective generally parallel spaced axes, each slat-like member having a parabolic focusing reflecting surface and having heat exchange means having a heat absorbing surface, each member having supporting means at each end to permit each member to pivot about the respective axis and being so positioned relative to an adjacent member that one member can be oriented such that the sun's rays are reflected from the parabolic reflecting surface of the one member and concentrated upon the heat absorbing surface of the heat exchange means of another, and adjacent, member.

11. A venetian-blind solar collector as claimed in claim 10 wherein the spacing between members is substantially vertical and wherein the collector comprises at least three members positioned one above the other, each member being pivoted about a respective axis such that solar energy is reflected by the reflecting surface of the lowest slat-like member upon the heat absorbing surface of the next higher slat-like member to the uppermost slat-like member of the collector, the vertical dimension of each slat-like member and the vertical separation between slat-like members being such that the collector can be closed by pivoting the slat-like members to a closed position to insulate a space or room from the outside environment.

12. A venetian-blind solar collector as claimed in claim 10 in which the reflecting surface of each member is provided by a reflector comprising a replaceable metalized plastic sheet which is retained under parallel wires or cords held at the ends, under tension, and positioned to produce a parabolic reflector shape.

13. A venetian-blind solar collector as claimed in claim 10 that further includes a secondary reflector within each member and arranged so as to accept off-axis rays and direct them to the heat exchange means.

14. A venetian-blind solar collector as claimed in claim 10 in which the width of each slat-like member and the longitudinal separation between slat-like members are such that the collector can be closed by pivoting the slat-like members to a closed position to insulate a space or room from the outside environment.

15. A venetian-blind solar collector as claimed in claim 14 wherein said heat exchange means comprises a tube within each slat-like member and oriented lengthwise along its member, through which a liquid heat exchange medium can flow and in which said supporting means at each end of each member serves to permit flow of liquid to and from the member and between members, the liquid within each tube being flowed past the heat absorbing surface to effect heating thereof.

16. A venetian-blind solar collector as claimed in claim 15 wherein each slat-like member contains insulation to minimize heat transfer through the member.

17. A venetian-blind solar collector as claimed in claim 14 wherein each slat-like member contains insulation to minimize heat transfer through the member.

* * * * *